(12) United States Patent
Vaddi et al.

(10) Patent No.: US 10,781,792 B2
(45) Date of Patent: Sep. 22, 2020

(54) SYSTEM AND METHOD FOR CONTROLLING A PITCH ANGLE OF A WIND TURBINE ROTOR BLADE

(71) Applicant: GENERAL ELECTRIC COMPANY, Schenectady, NY (US)

(72) Inventors: Prashanth Reddy Vaddi, Bangalore (IN); Mark Edward Cardinal, Seattle, NY (US); Robert Peter Slack, Seattle, WA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/974,744

(22) Filed: May 9, 2018

(65) Prior Publication Data
US 2018/0335016 A1 Nov. 22, 2018

(30) Foreign Application Priority Data
May 18, 2017 (IN) .............................. 201741017483

(51) Int. Cl.
*F03D 7/04* (2006.01)
*F03D 7/02* (2006.01)
*F03D 17/00* (2016.01)

(52) U.S. Cl.
CPC ........... *F03D 7/0224* (2013.01); *F03D 7/024* (2013.01); *F03D 7/0292* (2013.01); *F03D 7/042* (2013.01);
(Continued)

(58) Field of Classification Search
CPC ........ F03D 7/0224; F03D 7/024; F03D 7/042; F03D 7/0292; F05B 2270/332; F05B 2270/1095
See application file for complete search history.

(56) References Cited

U.S. PATENT DOCUMENTS

| 6,361,275 B1 | 3/2002 | Wobben |
| 7,569,945 B2 | 8/2009 | Pedersen |

(Continued)

FOREIGN PATENT DOCUMENTS

| EP | 2 302 207 A1 | 3/2011 |
| EP | 3 015 705 A1 | 5/2016 |

(Continued)

OTHER PUBLICATIONS

Bossanyi, E. A., "Further load reductions with individual pitch control," Wind Energy—Wiley Online Library, Retrieved from the Internet URL: http://onlinelibrary.wiley.com/doi/10.1002/we.166/abstract, on Sep. 5, 2018, p. 1 (Jul. 7, 2005) (Abstract).

(Continued)

*Primary Examiner* — Ninh H. Nguyen
(74) *Attorney, Agent, or Firm* — Dority & Manning, P.A.

(57) ABSTRACT

The present disclosure is directed to a system for controlling a pitch angle of a rotor blade of a wind turbine. The system includes a pitch adjustment mechanism for adjusting the pitch angle of the rotor blade and a controller communicatively coupled to the pitch adjustment mechanism. The controller is configured to determine a wind asymmetry parameter based on an operating parameter of the wind turbine. The controller is also configured to determine first and second signal components of the wind asymmetry parameter, which are respectively indicative of a maximum load on a first wind turbine component and fatigue on a second wind turbine component. The controller is also configured to calculate a wear parameter based on the first and second signal components and initiate an adjustment of the pitch angle of the rotor blade based on the wear parameter.

18 Claims, 5 Drawing Sheets

(52) U.S. Cl.
CPC ...... *F03D 17/00* (2016.05); *F05B 2270/1095* (2013.01); *F05B 2270/32* (2013.01); *F05B 2270/321* (2013.01); *F05B 2270/332* (2013.01)

(56) References Cited

U.S. PATENT DOCUMENTS

| | | | |
|---|---|---|---|
| 8,239,071 | B2 | 8/2012 | Lausen |
| 8,249,754 | B2 | 8/2012 | Hayashi et al. |
| 8,261,599 | B2 | 9/2012 | Jeffrey et al. |
| 8,398,369 | B2 * | 3/2013 | Rebsdorf .............. F03D 7/0224 416/43 |
| 8,430,634 | B2 | 4/2013 | Williams |
| 9,523,352 | B2 | 12/2016 | Hernandez Mascarell et al. |
| 9,745,958 | B2 * | 8/2017 | Agarwal ................. F03D 7/044 |
| 9,835,137 | B2 * | 12/2017 | Atzler ................... F03D 7/0224 |
| 2010/0014969 | A1 | 1/2010 | Wilson et al. |
| 2012/0134813 | A1 | 5/2012 | Nies et al. |
| 2015/0132128 | A1 | 5/2015 | Zaib et al. |
| 2015/0176568 | A1 | 6/2015 | Laborda Rubio et al. |
| 2016/0252075 | A1 * | 9/2016 | Kruger ................. F03D 7/0224 416/1 |

FOREIGN PATENT DOCUMENTS

| | | |
|---|---|---|
| EP | 3 064 770 A1 | 9/2016 |
| WO | 2010/016764 A1 | 2/2010 |
| WO | 2016/023556 A1 | 2/2016 |
| WO | 2016/034180 A1 | 3/2016 |
| WO | 2016/091945 A1 | 6/2016 |
| WO | 2016/169964 A1 | 10/2016 |

OTHER PUBLICATIONS

Vali, M., et al., "Optimal multivariable individual pitch control for load reduction of large wind turbines," American Control Conference (ACC), pp. 3163-3169 (Jul. 6-8, 2016).

Extended European Search Report and Opinion issued in connection with corresponding EP Application No. 18171680.4 dated Sep. 28, 2018.

* cited by examiner

SYSTEM AND METHOD FOR CONTROLLING A PITCH ANGLE OF A WIND TURBINE ROTOR BLADE

FIELD

The present disclosure generally relates to wind turbines. More particularly, the present disclosure relates to systems and methods for controlling for controlling pitch angles of wind turbine rotor blades.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A drivetrain transmits the mechanical energy from the rotor blades to the generator. The generator then converts the mechanical energy into electrical energy that may be supplied to a utility grid.

The orientation of the rotor blades may be adjustable to control the amount of kinetic energy extracted from the wind. More specifically, the rotor blades may be rotatably coupled to the hub. In this respect, a pitch adjustment mechanism may rotate each rotor blade about a corresponding pitch axis to adjust a pitch angle of the rotor blade. As such, the pitch angles of the rotor blades may be adjusted between a feathered position where a minimum amount kinetic energy extracted from the wind and a power position where a maximum amount kinetic energy extracted from the wind.

Asymmetries in the wind experienced by the wind turbine may cause load imbalances on the rotor blades and various other components of the wind turbine. In this respect, the pitch adjustment mechanisms may adjust the pitch angles of the rotor blades to control these load imbalances. Reducing the load imbalances on the rotor blades other wind turbine components may reduce the wear thereon and extend the service life thereof. However, adjusting the pitch angles of the rotor blades may increase the wear on and reduce the service life of the pitch adjustment mechanisms.

Accordingly, improved wind turbines, and, in particular, improved systems and methods for controlling the pitch angle of wind turbine rotor blades, are desired in the art. Specifically, systems and methods that distribute the wear associated with load imbalances caused by wind asymmetries across various components of the wind turbine would be advantageous.

BRIEF DESCRIPTION

Aspects and advantages of the technology will be set forth in part in the following description, or may be obvious from the description, or may be learned through practice of the technology.

In one embodiment, the present disclosure is directed to a system for controlling a pitch angle of a rotor blade of a wind turbine. The system includes a rotor having a hub and a rotor blade. The system also includes a pitch adjustment mechanism for adjusting the pitch angle of the rotor blade by rotating the rotor blade about a pitch axis relative to the hub. The system further includes a controller communicatively coupled to the pitch adjustment mechanism. The controller is configured to determine a wind asymmetry parameter based on an operating parameter of the wind turbine. The wind asymmetry parameter is indicative of an asymmetry in the wind experienced by the wind turbine. The controller is also configured to determine first and second signal components of the wind asymmetry parameter. The first signal component is indicative of a maximum load on a first wind turbine component. The second signal component is indicative of fatigue on a second wind turbine component. The controller is further configured to calculate a wear parameter for the first and second wind turbine components based on the first and second signal components. Furthermore, the controller is configured to initiate an adjustment of the pitch angle of the rotor blade based on the wear parameter.

In another embodiment, the present disclosure is directed to a method for controlling a pitch angle of a rotor blade of a wind turbine. The method includes determining, with a controller, a wind asymmetry parameter based on an operating parameter of the wind turbine. The wind asymmetry parameter is indicative of an asymmetry in the wind experienced by the wind turbine. The method also includes determining, with the controller, first and second signal components of the wind asymmetry parameter. The first signal component is indicative of a maximum load on a first wind turbine component. The second signal component is indicative of fatigue on a second wind turbine component. The method further includes calculating, with the controller, a wear parameter for the first and second wind turbine components based on the first and second signal components. Furthermore, the method includes determining, with an actuator, an adjustment of the pitch angle of the rotor blade based on the wear parameter.

In a further embodiment, the present disclosure is directed to a method for controlling a pitch angle of a rotor blade of a wind turbine. The method includes determining, with a controller, a wind asymmetry parameter based on an operating parameter of the wind turbine. The wind asymmetry parameter is indicative of an asymmetry in the wind experienced by the wind turbine. The method also includes determining, with the controller, first and second signal components of the wind asymmetry parameter. The first signal component is indicative of a maximum load on the rotor blade. The second signal component is indicative of fatigue on a pitch adjustment mechanism. The method further includes calculating, with the controller, a wear parameter for the first and second wind turbine components based on the first and second signal components. Furthermore, the method includes determining, with an actuator, an adjustment of the pitch angle of the rotor blade based on the wear parameter.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
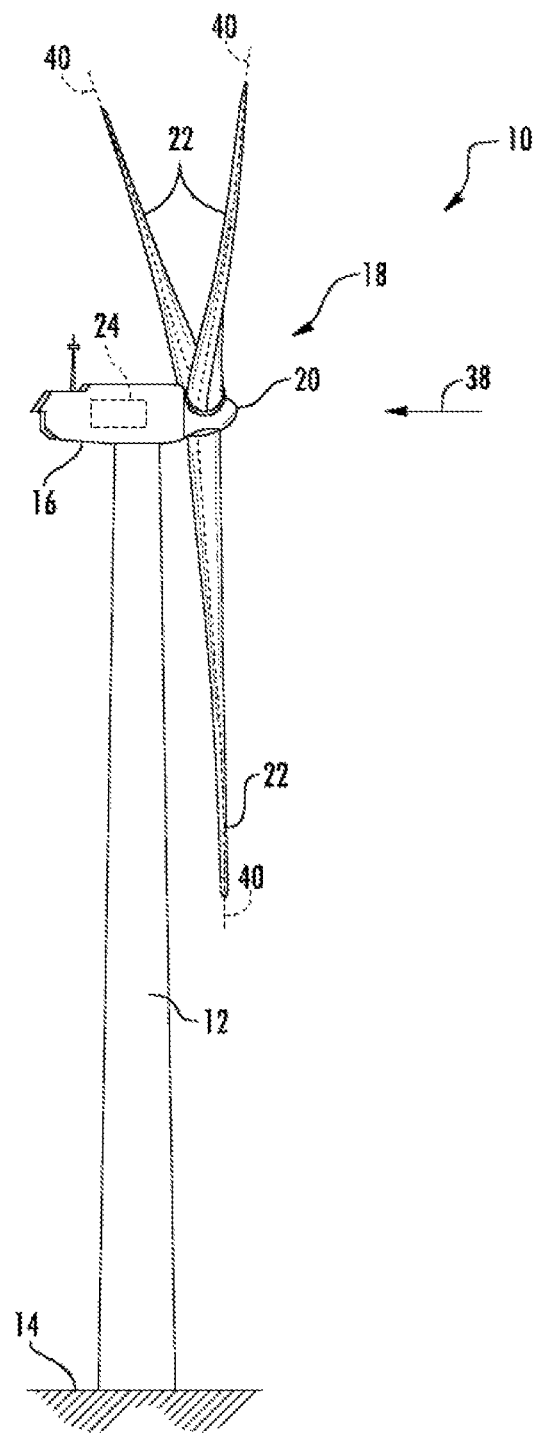
FIG. 1 is a perspective view of a wind turbine according to one embodiment of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 is a perspective view of one embodiment of an exemplary wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotating the rotor 18 to convert kinetic energy from the wind into usable rotational, mechanical energy. A generator 24 positioned in the nacelle 16 may generate electrical power from the rotational energy of the rotor 18.

Figure 2:
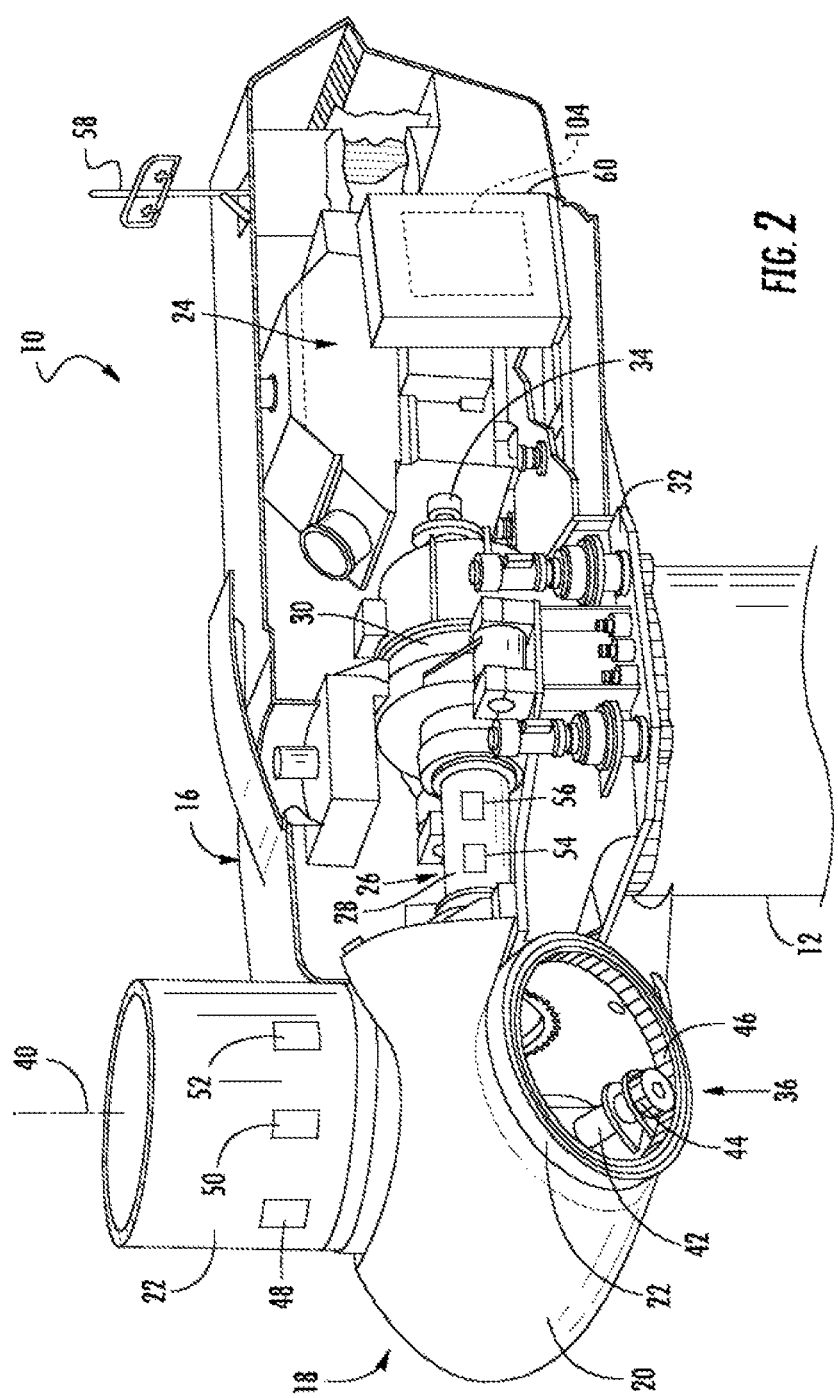
FIG. 2 is a perspective, internal view of a nacelle of a wind turbine according to one embodiment of the present disclosure.

Referring now to FIG. 2, a drivetrain 26 rotatably couples the rotor 18 to the electric generator 24. As shown, the drivetrain 26 may include a rotor shaft 28, which rotatably couples the hub 20 of the rotor 18 to a gearbox 30. The gearbox 30 may be supported by and coupled to a bedplate 32 in the nacelle 16. The drivetrain 26 may also include a generator shaft 34, which rotatably couples the gearbox 30 to the generator 24. In this respect, rotation of the rotor 18 drives the generator 24. More specifically, the rotor shaft 28 may provide a low speed, high torque input to the gearbox 30 in response to rotation of the rotor blades 22 and the hub 20. The gearbox 30 may then convert the low speed, high torque input into a high speed, low torque output to drive the generator shaft 34 and, thus, the generator 24. In alternate embodiments, however, the generator 24 may be directly rotatably coupled to the rotor shaft 28 in a direct-drive configuration.

The wind turbine 10 may also include one or more pitch adjustment mechanisms 36. Although FIG. 2 only illustrates one pitch adjustment mechanism 36, the wind turbine 10 may include three pitch adjustment mechanisms 36. In this respect, the wind turbine 10 may include one pitch adjustment mechanism 36 corresponding to each rotor blade 22. In alternate embodiments, however, the wind turbine 10 may include more or fewer pitch adjustment mechanisms 36.

Each pitch adjustment mechanism 36 may adjust a pitch angle of the corresponding rotor blade 22 (i.e., the angular orientation of the rotor blade 22 with respect to a direction 38 (FIG. 1) of the wind). In particular, each rotor blade 22 may be rotatably coupled to the hub 20 by a pitch bearing (not shown). As such, each pitch adjustment mechanism 36 may rotate the corresponding rotor blade 22 about a corresponding pitch axis 40 (FIG. 1) relative to the hub 20, thereby adjusting the pitch angle of the rotor blade 22.

FIG. 2 illustrates an exemplary embodiment of one of the pitch adjustment mechanisms 36. More specifically, the pitch adjustment mechanism 36 may include an electric motor 42 having a pinion gear 44 coupled thereto. The pinion gear 44 may engage a ring gear 46 formed on or coupled to an inner surface of the rotor blade 22. During operation of the pitch adjustment mechanism 36, the electric motor 42 rotates the pinion gear 44. The pinion gear 44, in turn, rotates the ring gear 46, thereby rotating the rotor blade 22 about the corresponding pitch axis 40. In alternate embodiments, the pitch adjustment mechanism 36 may include any suitable type of actuator and/or any suitable structure or mechanism for transmitting the movement of the actuator to the corresponding rotor blade 22.

The wind turbine 10 may further include various sensors. In the embodiment shown in FIG. 2, for example, the wind turbine 10 includes a pitch angle sensor 48, a rotor blade acceleration sensor 50, a rotor blade deflection sensor 52, a rotor shaft position sensor 54, a rotor shaft deflection sensor 56, and a wind speed sensor 58. In alternate embodiments, however, the wind turbine 10 may include only some of the sensors 48, 50, 52, 54, 56, 58 or none of the sensors 48, 50, 52, 54, 56, 58. Furthermore, the wind turbine 10 may include other sensors in addition to or lieu of the sensors 48, 50, 52, 54, 56, 58.

The pitch angle sensor 48 detects a pitch angle of the corresponding rotor blade 22. In this respect, the pitch angle sensor 48 is operatively coupled to one of the rotor blades 22 as shown in FIG. 2. Although only one pitch angle sensor 48 is shown in FIG. 2, the wind turbine 10 may include one pitch angle sensor 48 operatively coupled to each rotor blade 22. The pitch angle sensor 48 may be a Hall Effect sensor or any other suitable type of sensor for detecting absolute or incremental rotational position.

The rotor blade acceleration sensor 50 detects an acceleration of the corresponding rotor blade 22. In this respect, the rotor blade acceleration sensor 50 is operatively coupled to one of the rotor blades 22 as shown in FIG. 2. Although only one rotor blade acceleration sensor 50 is shown in FIG. 2, the wind turbine 10 may include one rotor blade acceleration sensor 50 operatively coupled to each rotor blade 22. The rotor blade acceleration sensor 50 may be a micro inertial measurement unit or any other suitable type of sensor for detecting acceleration.

The rotor blade deflection sensor 52 detects a deflection of one of the rotor blade 22, such as a deflection caused by asymmetries in the wind. In this respect, the load sensor 52 may be operatively coupled to the corresponding rotor blade 22 as shown in FIG. 2. Although only one rotor blade deflection sensor 52 is shown in FIG. 2, the system 100 may include one rotor blade deflection sensor 52 operatively coupled to each rotor blade 22. The rotor blade deflection sensor 52 may be a strain gauge, proximity sensor, or any other suitable type of sensor for detecting deflection.

The rotor shaft position sensor 54 detects a rotational position of the rotor shaft 28. In some embodiments, the rotational position of the rotor shaft 28 may be used to determine the rotational velocity of the rotor blades 22. As shown in FIG. 2, the rotor shaft position sensor 54 is operatively coupled to a rotor shaft 28. The rotor shaft position sensor 54 may be a Hall Effect sensor or any other suitable type of sensor for detecting absolute or incremental rotational position.

The rotor shaft deflection sensor 56 detects a deflection of the rotor shaft 28, such as a deflection caused by an asymmetry in the wind. In this respect, the rotor shaft deflection sensor 56 may be operatively coupled to the rotor shaft 28 as shown in FIG. 2. The rotor shaft deflection sensor 56 may be a strain gauge, proximity sensor, or any other suitable type of sensor for detecting the deflection.

The wind speed sensor 58 detects a speed of the wind experienced by the wind turbine 10. In the embodiment in FIG. 2, the wind speed sensor 58 is mounted to the exterior of the nacelle 16. As such, the wind speed sensor 58 may be a suitable anemometer or a wind vane. In alternate embodiments, however, the wind speed sensor 58 may be a light detection and ranging (LIDAR) sensor, an ultrasonic sensor, or any other suitable type of sensor for detecting wind velocity. In some embodiments, the wind turbine 10 may include a plurality of wind speed sensors 58 to detect the speed of the wind at different locations, such as two vertically spaced apart anemometers. In further embodiments, the wind speed sensor 58 may be separate from the wind turbine 10, such as a wind speed measurement tower for a wind turbine farm.

Figure 3:
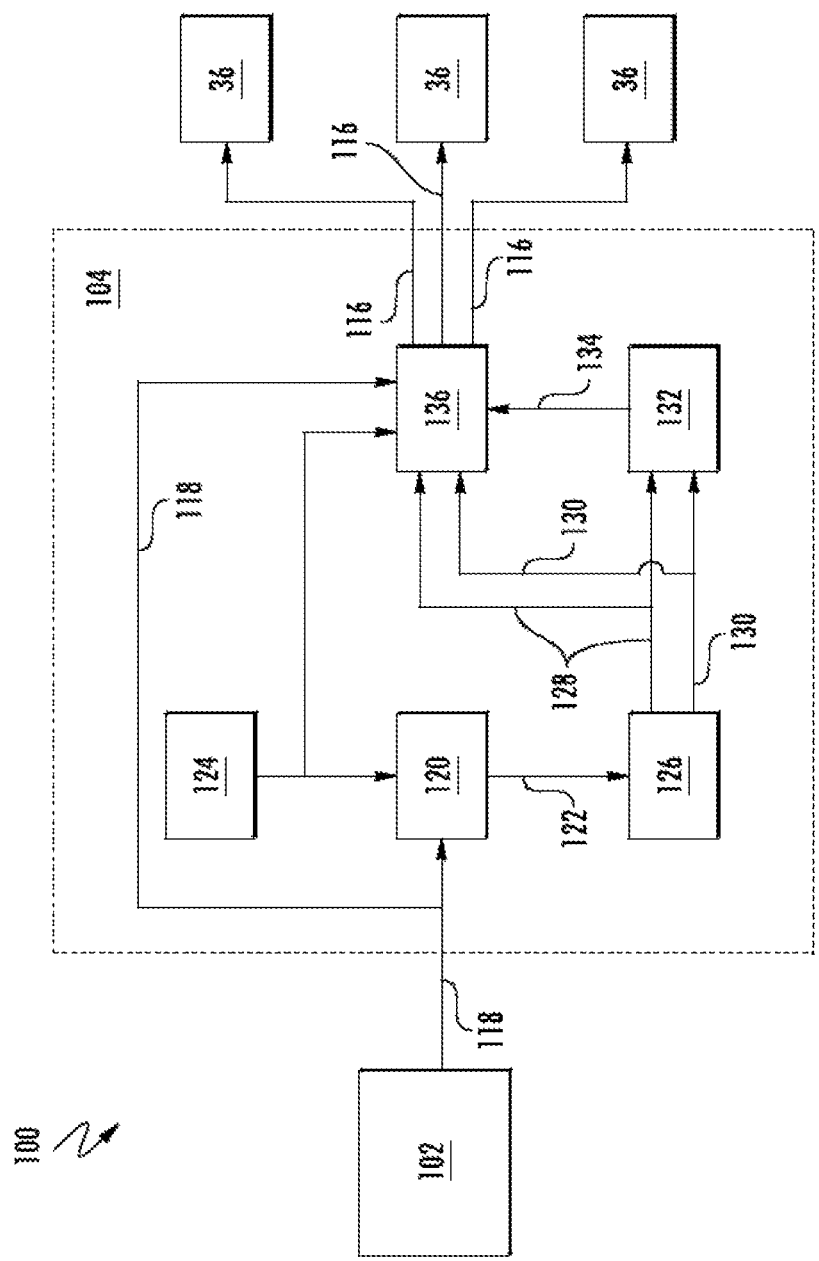
FIG. 3 is a schematic view of a system for controlling a pitch angle of a rotor blade of a wind turbine according to one embodiment of the present disclosure.

FIG. 3 illustrates a system 100 for controlling the pitch angle of the rotor blades 22 of the wind turbine 10. As mentioned above, asymmetries in the wind may cause load imbalances on certain components of the wind turbine 10. As will be discussed in greater detail below, the system 100 controls the pitch angle of the rotor blades 22 to distribute the wear caused by these load imbalances across various components of the wind turbine 10.

As shown, the system 100 may include a sensor 102 for detecting an operating parameter of the wind turbine 10. The operating parameter may be associated with or is indicative an asymmetry in the wind experienced by the wind turbine 10. For example, the operating parameter may be a pitch angle of one or more of the rotor blades 22, an acceleration of one or more of the rotor blades 22, a deflection of one or more of the rotor blades 22, a position or speed of the rotor shaft 28, a deflection of the rotor shaft 28, or a speed (or variation in the speed) of the wind experienced by the wind turbine 10. In this respect, the sensor 102 may correspond to the pitch angle sensor(s) 48, the rotor blade acceleration sensor(s) 50, the rotor blade deflection sensor(s) 52, the rotor shaft position sensor 54, the rotor shaft deflection sensor 56, or the wind speed sensor(s) 58. Although only one sensor 102 is shown in FIG. 3, the system 100 may include more sensors 102, such as two vertically spaced apart wind speed sensors 58 for detecting a speed of the wind at different locations. In alternate embodiments, the sensor 102 may correspond to sensors not shown in FIG. 2. Furthermore, the operating parameter may be any suitable parameter that corresponds to a current condition within the wind turbine 10 or an environmental condition experienced by the wind turbine 10.

The system 100 also includes a controller 104 communicatively coupled to one or more components of the system 100 and/or the wind turbine 10, such as the sensor(s) 102 and the pitch adjustment mechanisms 36. In the embodiment shown in FIG. 2, for example, the controller 104 is disposed within a control cabinet 60 mounted to a portion of the nacelle 16. In alternate embodiments, however, the controller 104 may be disposed at any location on or in the wind turbine 10, at any location on the support surface 14, or any other suitable location.

Figure 4:
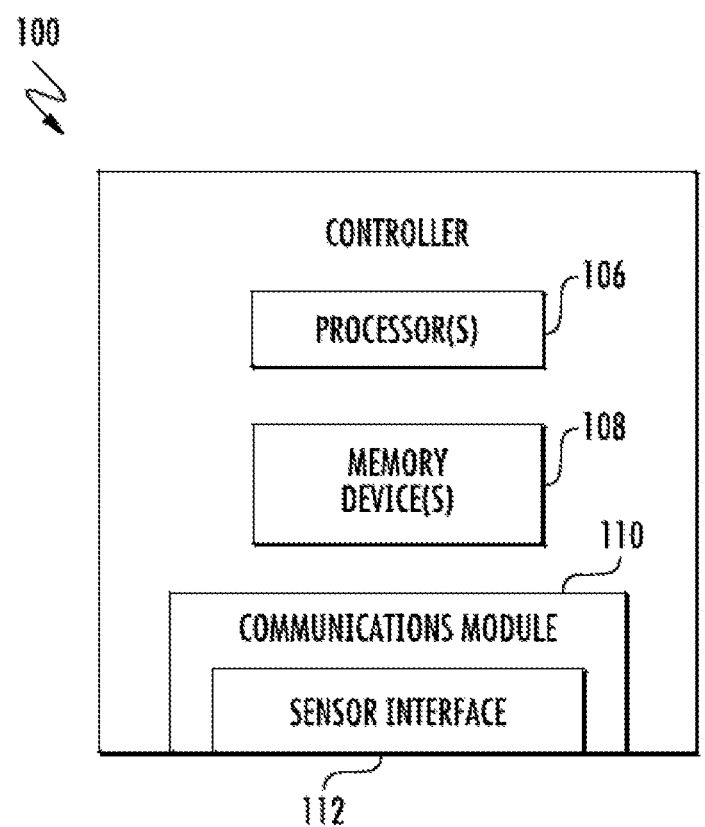
FIG. 4 is a schematic view of a controller of a system for controlling a pitch angle of a rotor blade of a wind turbine according to one embodiment of the present disclosure.
Figure 5:
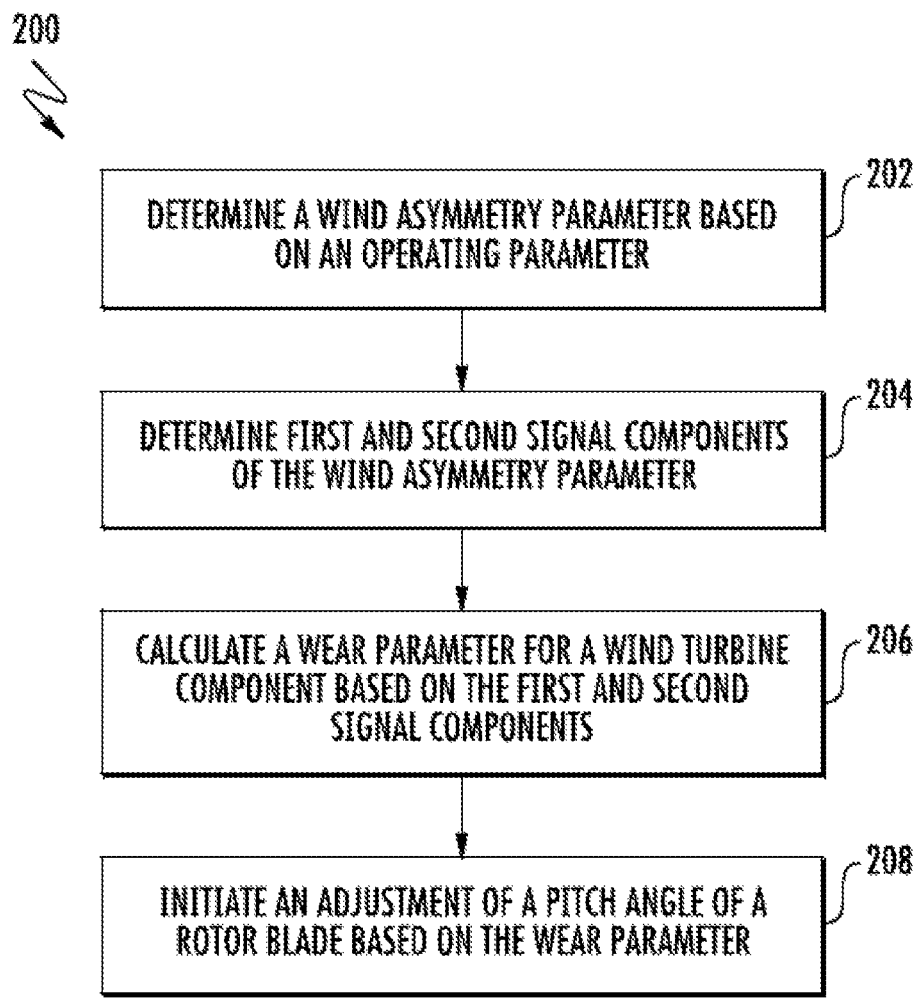
FIG. 5 is a flow chart illustrating a method for controlling a pitch angle of a rotor blade of a wind turbine according to one embodiment of the present disclosure.

In general, the controller 104 may correspond to any suitable processor-based device, including one or more computing devices. As shown in FIG. 4, for example, the controller 104 may include one or more processors 106 and one or more associated memory devices 108 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory device(s) 108 may generally include memory element(s) including, but not limited to, a computer readable medium (e.g., random access memory (RAM)), a computer readable non-volatile medium (e.g., flash memory), a compact disc-read only memory (CD-ROM), a magneto-optical disk (MOD), a digital versatile disc (DVD), and/or other suitable memory elements or combinations thereof. The memory device(s) 108 may store instructions that, when executed by the processor 106, cause the processor 106 to perform functions (e.g., method 200 described below).

The controller 104 may also include a communications module 110 to facilitate communications between the controller 104 and the various components of the system 100 and/or the wind turbine 10. For example, the communications module 110 may permit the controller 104 to receive data from the sensor 102. As such, the communications module 110 may include a sensor interface 112 (e.g., one or more analog-to-digital converters) that converts measurement signals 116 received from the sensor 102 into signals that can be understood and processed by the processors 106. Furthermore, the communications module 110 may permit the controller 104 to transmit control signals 118 to each pitch adjustment mechanism 36 for controlling the pitch angle of the rotor blades 22. In this respect, the communications module 110 may be any combination of suitable wired and/or wireless communication interfaces that communicatively couple the sensor 102 and the pitch adjustment mechanisms 36 to the controller 110.

As mentioned above, the system 100 controls the pitch angles of the rotor blades 22 during operation of the wind turbine 10. More specifically, the asymmetries in the wind (e.g., caused by wind shear, up-flow, nearby wind turbines, turbulence, etc.) may cause load imbalances on certain components of the wind turbine 10 (e.g., the rotor blades 22), thereby causing these components to incur wear. However, adjusting the pitch angles of the rotor blades 22 to minimize these load imbalances may cause other components (e.g., the pitch adjustment mechanisms 36) to incur wear. In this respect, the system 100 may control the pitch angles of the rotor blades 22 in a manner that distributes the wear across various components of the wind turbine 10. For example, the system 100 may adjust the pitch angles of the rotor blades 22 to prevent the wind asymmetries from exerting large loads on the rotor blades 22, while minimizing the distance that the pitch adjustment mechanisms 36 must move the rotor blades 22.

The system 100 will be described below in the context of distributing wear between the rotor blades 22 and the corresponding pitch adjustment mechanisms 36. However, the system 100 may be used to distribute wear between any component of the wind turbine 10 that may experience a load imbalance due to a wind asymmetry (e.g., the tower 12, the nacelle 16, the rotor shaft 28, the gearbox 30, one of the pitch bearings (not shown), or a yaw bearing (not shown)) and any actuator of the wind turbine 10 (e.g., a yaw adjustment system (not shown)).

Referring again to FIG. 3, the controller 104 may be configured to control the pitch adjustment mechanisms 36 by executing various logic stored on the memory device(s) 108. In particular, the controller 104 (e.g., via the processor(s) 106) executes the logic to create the control signals 116 based on the data received from the sensor 102 and/or data stored in the memory device(s) 108. Using the control signals 116, the pitch adjustment mechanisms 36 adjust the pitch angles of the corresponding rotor blades 22 to distribute the wear caused by the load imbalances across various components (e.g., between the rotor blades 22 and the pitch adjustment mechanisms 36) of the wind turbine 10. The controller 104 may control each pitch adjustment mechanism 36 individually (i.e., the control signals 116 may be different for each pitch adjustment mechanism 36) in some embodiments. In alternate embodiments, however, the controller 104 may control all of pitch adjustment mechanisms 36 as a collective unit (i.e., the control signals 116 may be the same for each pitch adjustment mechanism 36).

The controller 104 may be configured to determine a wind asymmetry parameter. As mentioned above, the controller 104 is communicatively coupled to the sensor 102. In this respect, the controller 104 receives the measurement signals 118 indicative of the operating parameter of the wind turbine 10 from the sensor 102. In embodiments of the system 100 that include more than one sensor 102, the controller 104 may receive additional measurement signals 118 indicative of other operating parameters from the additional sensors 102. As shown in FIG. 3, the controller 104 may include wind asymmetry parameter logic 120 having one or more mathematical functions and/or one or more look-up tables. By executing the wind asymmetry parameter logic 120, the controller 110 may generate a wind asymmetry parameter signal 122 indicative of the wind asymmetry parameter based on the measurement signal(s) 118 received by the controller 104 and/or wind turbine data 124 stored in the memory device(s) 108. The wind asymmetry parameter may be any parameter associated with or indicative of an asymmetry in the wind experienced by the wind turbine 10. In particular, the wind asymmetry parameter may be associated with any asymmetry in the wind around the rotor 18, including slow-varying asymmetries, such wind up flow, wind shear, wind veer, and wind direction, and fast-varying asymmetries, such as wind turbulence and wind gust. For example, the wind asymmetry parameter may be a difference in the magnitudes and/or directions of the wind speed detected at different positions on the wind turbine 10, a difference in the deflections and/or accelerations of the rotor blades 22, or a magnitude and/or a direction of a deflection of the rotor shaft 28. The wind turbine data 124 may include any predetermined parameters, values, or other data useful in determining the wind asymmetry parameter, such as a distance between two of the sensors 102. In some embodiments, the wind turbine data 124 may not be used to determine the wind asymmetry parameter. In alternate embodiments, the wind asymmetry parameter logic 120 may use any suitable methodology or criteria to determine the wind asymmetry parameter.

The controller 104 may also be configured to determine first and second signal components 128, 130 of the wind asymmetry parameter signal 122. In this respect, the controller 104 may include signal component logic 126 having one or more mathematical functions and/or one or more look-up tables. By executing the signal component logic 126, the controller 104 may determine the first and second signal components 128, 130 of the wind asymmetry parameter signal 122. In some embodiments, the signal component logic 126 may include one or more filters (e.g., low-pass filters, high-pass filters, band-pass filters, etc.) that filter the wind asymmetry parameter signal 122 to determine the first and/or second signal components 128, 130. The first signal component 128 may be associated with or indicative of an estimated maximum load exerted on the rotor blades 22 due to the wind asymmetry. Conversely, the second signal component 130 is associated with or indicative of an estimated fatigue on the pitch adjustment mechanisms 36 when the pitch adjustment mechanisms 36 adjust the pitch angles of the rotor balances to mitigate the load imbalance. In this respect, the first and second signal components may be one or more low pass components, band pass components, high pass components, notch components, spectral magnitude components, or phase components. For example, the first signal component 128 may be a weighted combination of low frequency and high frequency spectral amplitudes of the wind asymmetry parameter signal 122. The second signal component 130 may be a filtered magnitude, a spectral component, or a phase component of the wind asymmetry parameter signal 122. In some embodiments, each of the first and/or second signal components 128, 130 may be a single signal component of the wind asymmetry parameter signal 122 or a combination of signal components of the wind asymmetry parameter signal 122. In alternate embodiments, the signal component logic 126 may use any suitable methodology or criteria to determine the wind asymmetry parameter.

The controller 104 may further be configured to calculate a wear parameter for the rotor blade 22 and pitch adjustment mechanism 36 based on the first and second signal components 128, 130. In this respect, the controller 104 may include wear parameter logic 132 having one or more mathematical functions. By executing the wear parameter logic 132, the controller 104 may generate a wear parameter signal 134 indicative of the wear parameter based on the first and second signal component 128, 130. In some embodiments, the mathematical function may include variables for the first and second signal components 128, 130 and coefficients based on or derived from various properties of the rotor blades 22 and/or the pitch adjustment mechanisms 36. In alternate embodiments, the wear parameter logic 132 may use any suitable methodology or criteria to determine the wind asymmetry parameter.

The controller 104 may use the wear parameter to distribute the wear between the rotor blades 22 and pitch adjustment mechanisms 36. In this respect, the wear parameter is associated with or indicative of a comparison between the estimated wear on the rotor blades 22 if the rotor blades 22 were to endure the load imbalance caused by the wind asymmetry and the estimated wear on the pitch adjustment mechanisms 36 if the pitch adjustment mechanism 36 were to adjust the pitch angle of the rotor blade 22 to minimize the load on the rotor blade 22. In some embodiments, the wear parameter is based on additional parameters, such as the value and/or the replacement difficulty of the rotor blades 22 and pitch adjustment mechanisms 36. As such, the wear parameter may be representative of whether the system 100 should allow the rotor blade 22 to endure the load imbalance or adjust the pitch angle of the rotor blade 22 to minimize the load imbalance. Although the wear parameter is described above in the context of the rotor blades 22 and pitch adjustment mechanisms 36, the wear parameter may be based on any number and/or type of components of the wind turbine 10.

Furthermore, the controller 104 may be configured to selectively initiate an adjustment of the pitch adjustment mechanisms 36 based on the wear parameter. In this respect, the controller 104 may not adjust the pitch angles of the rotor blades 22 when the wear parameter indicates that it is desirable for the rotor blades 22 to incur the load imbalance caused by the wind asymmetry. Conversely, wear parameter indicates that it is desirable for the pitch adjustment mechanisms 36 to incur wear from adjusting the pitch angles of the rotor blades 22, the controller 104 may initiate adjustment of the pitch adjustment mechanisms 36. As mentioned above, the controller 104 is communicatively coupled to the pitch adjustment mechanisms 36. In this respect, the controller 104 transmits the control signals 116 indicative of desired pitch angles of the rotor blades 22 to the corresponding pitch adjustment mechanism 36. As shown in FIG. 3, the controller 104 may include pitch angle logic 136 having one or more mathematical functions and/or one or more look-up tables. By executing the pitch angle logic 136, the controller 110 may generate the controls signals 118 indicative of desired pitch angles of the rotor blades 22 based on the wear parameter signal 134. In some embodiments, the control signals 118 may also be based on the first and/or second signal component 128, 130, the wind turbine data 124, and/or the measurement signals 116 from sensor(s) 102. Based on the control signals 116, the pitch adjustment mechanisms 36 adjust the pitch angles of the rotor blades 22 to desired pitch angle. For example, when the wear parameter indicates that it is desirable to adjust the pitch angles of the rotor blades 22 to mitigate the load imbalance thereon, the control signals 118 may instruct the pitch adjustment mechanisms 36 to make the desired adjustments. Conversely, when the wear parameter indicates that it is desirable for the rotor blades 22 to endure the loads thereon, the control signals 118 may instruct the pitch adjustment mechanisms 36 to maintain the current pitch angles of the rotor blades 22.

In some embodiments, the pitch angle logic 136 may include various mathematical functions to optimize the adjustment of the pitch angles of the rotor blades 22. For example, the pitch angle logic 36 may include a dead band range. In this respect, the controller 104 may be configured to compare the wear parameter to the dead band range. As such, the controller 104 may be configured to transmit control signals 118 to the pitch adjustment mechanisms 36 that instruct the pitch adjustment mechanisms 36 to adjust the pitch angles of the rotor blades 22 only when the wear parameter falls outside of the dead band range. In further embodiments, the pitch angle logic 136 may also include an inequality comparison, a hysteresis band, linear functions, and/or non-linear functions.

FIG. 6 illustrates a method 200 for controlling the pitch angles of the rotor blades 22 of the wind turbine 10 in accordance with embodiments of the present disclosure.

In step 202, the wind asymmetry parameter is determined based on an operating parameter. For example, the sensor 102 may detect an operating parameter of the wind turbine 10. In this respect, the controller 104 may receive the measurement signals 118 indicative of the operating parameter from the sensor 102. The controller 104 may then execute logic (e.g., the wind asymmetry parameter logic 120) to generate the wind asymmetry parameter signal 22 based on the measurement signals 118 and/or the wind turbine data 124. As discussed in greater detail above, the logic may include one or more look-up tables and/or one or more mathematical functions.

In step 204, the first and second signal components 128, 130 are determined from the wind asymmetry parameter. For example, the controller 104 may then execute logic (e.g., the signal component logic 126) to generate the first and second signal component 128, 130 based on the wind asymmetry parameter signal 122. As discussed in greater detail above, the logic may include one or more look-up tables and/or one or more mathematical functions. In some embodiments, the logic may include one or more filters.

In step 206, the wear parameter is calculated from the first and second signal components 128, 130. For example, the controller 104 may then execute logic (e.g., the wear parameter logic 132) to generate the wear parameter signal 134 based on the first and second signal component 128, 130. As discussed in greater detail above, the logic may include one or more mathematical functions.

In step 208, pitch angle adjustments of the rotor blades 22 are selectively initiated based on the wear parameter. As described above, the controller 104 may be configured to determine whether to initiate an adjustment of the pitch angles of the rotor blades 22 based on the wear parameter. When the wear parameter indicates that an adjustment of the pitch angles of the rotor blades 22 is desirable, the controller 104 may then execute logic (e.g., the pitch angle logic 136) to generate the control signals 116 based on the wear parameter signal 134. In some embodiments, the control signals 116 may be also based on the first and second signal component 128, 130, the wind turbine data 124, and/or the measurement signals 118. Furthermore, the controller 104 may compare the wear parameter to a dead band range and initiate an adjustment of the pitch angles of the rotor blades 22 when the wear parameter falls outside of the dead band range. As discussed in greater detail above, the logic may include one or more look-up tables and/or one or more mathematical functions.

As discussed above, the system 100 and the method 200 distribute wear caused by wind asymmetries between various components of the wind turbine 10 based on the wear parameter. In this respect, and unlike conventional systems and methods, the wear is not concentrated on particular components of the wind turbine 10, thereby increasing the service life of these components (e.g., the rotor blades 22, the pitch adjustment mechanisms, etc.) and the wind turbine 10.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for controlling a pitch angle of a rotor blade of a wind turbine, the system comprising:
   a rotor including a hub and a rotor blade;
   a pitch adjustment mechanism for adjusting the pitch angle of the rotor blade by rotating the rotor blade about a pitch axis relative to the hub; and
   a controller communicatively coupled to the pitch adjustment mechanism, the controller configured to:
      determine a wind asymmetry parameter, the wind asymmetry parameter being a difference in at least one of a magnitude and a direction of an operating parameter of the wind turbine detected at different positions on the wind turbine, the wind asymmetry parameter being indicative of an asymmetry in the wind experienced by the wind turbine;
      filter the wind asymmetry parameter via a first filter so as to extract a first signal component indicative of a maximum load on a first wind turbine component resulting from the wind asymmetry;
      filter the wind asymmetry parameter via a second filter so as to extract a second signal component indicative of a fatigue experienced by a second wind turbine component when adjusting an aspect of the wind turbine to mitigate a load imbalance resulting from the wind asymmetry;
      calculate a wear parameter for the first and second wind turbine components based on the first and second signal components; and
      initiate an adjustment of the pitch angle of the rotor blade based on the wear parameter.

2. The system of claim 1, wherein the wind turbine asymmetry parameter is associated with wind up flow, wind shear, wind veer, wind direction, wind turbulence, or wind gust.

3. The system of claim 1, wherein the pitch adjustment mechanism is further controlled to adjust the pitch angle of the rotor blade based on the first or second signal component.

4. The system of claim 1, further comprising:
   a sensor communicatively coupled to the controller, the sensor being configured to detect the operating parameter of the wind turbine.

5. The system of claim 1, wherein the first component is one a tower, a nacelle, a rotor shaft, or and gearbox and the second component is an actuator.

6. The system of claim 1, wherein the first and second signal components comprise one or more low pass components, band pass components, high pass components, notch components, spectral magnitude components, or phase components.

7. The system of claim 1, wherein the first signal component comprises a weighted combination of a low frequency spectral amplitude of the wind asymmetry parameter and a high frequency spectral amplitude of the wind asymmetry parameter and the second signal component comprises one or more of a filtered magnitude of the wind asymmetry parameter, a spectral component of the wind asymmetry parameter, or a phase component of the wind asymmetry parameter.

8. The system of claim 1, wherein the controller is further configured to compare the wear parameter to a dead band range and initiate an adjustment of the pitch angle of the rotor blade when the wear parameter falls outside of the dead band range.

9. A method for controlling a pitch angle of a rotor blade of a wind turbine, the method comprising:
   determining, with a controller, a wind asymmetry parameter, the wind asymmetry parameter being a difference in at least one of a magnitude and a direction of an operating parameter of the wind turbine, the wind asymmetry parameter being indicative of an asymmetry in the wind experienced by the wind turbine;
   filtering, with the controller, the wind asymmetry parameter so as to extract a first signal component indicative of a maximum load on a first wind turbine component resulting from the wind asymmetry;
   filtering, with the controller, the wind asymmetry parameter so as to extract a second signal component indicative of a fatigue experienced by a second wind turbine component when adjusting an aspect of the wind turbine to mitigate a load imbalance resulting from the wind asymmetry;
   calculating, with the controller, a wear parameter for the first and second wind turbine components based on the first and second signal components; and
   determining, with the controller, an adjustment of the pitch angle of the rotor blade based on the wear parameter.

10. The method of claim 9, wherein the wind turbine asymmetry parameter is associated with wind up flow, wind shear, wind veer, wind direction, wind turbulence, or wind gust.

11. The method of claim 9, further comprising:
    adjusting, with the actuator, the pitch angle of the rotor blade based on the first and second signal components.

12. The method of claim 9, further comprising:
    detecting, with a sensor communicatively coupled to the controller, the operating parameter of the wind turbine.

13. The method of claim 12, further comprising:
    detecting, with the sensor, a deflection of a rotor shaft of the wind turbine.

14. The method of claim 9, wherein the first component is one a tower, a nacelle, a rotor shaft, or and gearbox and the second component is an actuator.

15. The method of claim 9, wherein the first and second signal components comprise one or more low pass components, band pass components, high pass components, notch components, spectral magnitude components, or phase components.

16. The method of claim 9, wherein the first signal component comprises a weighted combination of a low frequency spectral amplitude of the wind asymmetry parameter and a high frequency spectral amplitude of the wind asymmetry parameter and the second signal component comprises one of more of a filtered magnitude of the wind asymmetry parameter, a spectral component of the wind asymmetry parameter, or a phase component of the wind asymmetry parameter.

17. The method of claim 9, further comprising:
    comparing, with the controller, the wear parameter to a dead band range; and
    initiating, with the controller, an adjustment of the pitch angle of the rotor blade when the wear parameter falls outside of the dead band range.

18. A method for controlling a pitch angle of a rotor blade of a wind turbine, the method comprising:

determining, with a controller, a wind asymmetry parameter, the wind asymmetry parameter being a difference in at least one of a magnitude and a direction of an operating parameter of the wind turbine, the wind asymmetry parameter being indicative of an asymmetry in the wind experienced by the wind turbine;

filtering, with the controller, the wind asymmetry parameter so as to extract a first signal component indicative of a maximum load on the rotor blade resulting from the wind asymmetry;

filtering, with the controller, the wind asymmetry parameter so as to extract a second signal component indicative of a fatigue experienced by a pitch adjustment mechanism when adjusting the pitch of the rotor blade to mitigate a load imbalance resulting from the wind asymmetry;

calculating, with the controller, a wear parameter for the rotor blade and the pitch adjustment mechanism based on the first and second signal components; and determining, with the controller, an adjustment of the pitch angle of the rotor blade based on the wear parameter.

\* \* \* \* \*